US011281621B2

(12) United States Patent
Boerner et al.

(10) Patent No.: US 11,281,621 B2
(45) Date of Patent: Mar. 22, 2022

(54) CLIENTLESS ACTIVE REMOTE ARCHIVE

(71) Applicant: International Business Machines Corporation, Armonk, NY (US)

(72) Inventors: Kai Boerner, Weiterstadt (DE); Fabian Kuhl, Wiesbaden (DE); Dominic Mueller-Wicke, Weilburg (DE); Thomas Schreiber, Klein-Winternheim (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 286 days.

(21) Appl. No.: 15/864,454

(22) Filed: Jan. 8, 2018

(65) Prior Publication Data

US 2019/0213265 A1 Jul. 11, 2019

(51) Int. Cl.
*G06F 16/11* (2019.01)
*G06F 16/13* (2019.01)

(52) U.S. Cl.
CPC .......... *G06F 16/113* (2019.01); *G06F 16/122* (2019.01); *G06F 16/13* (2019.01)

(58) Field of Classification Search
CPC ...... G06F 3/067; G06F 16/178; G06F 16/113; G06F 3/065; G06F 16/182; G06F 16/27; G06F 16/122; G06F 16/13
See application file for complete search history.

(56) References Cited

U.S. PATENT DOCUMENTS

| 8,849,955 | B2 | 9/2014 | Prahlad et al. |
| 9,069,778 | B1 | 6/2015 | Bent et al. |
| 9,118,689 | B1 | 8/2015 | Apte et al. |
| 2012/0179779 | A1 | 7/2012 | Awasthi |
| 2013/0024421 | A1* | 1/2013 | Shinohara ............... G06F 3/067 707/622 |

(Continued)

FOREIGN PATENT DOCUMENTS

| CN | 104636845 A | 5/2015 |
| EP | 2864877 A1 | 4/2015 |

OTHER PUBLICATIONS

"OpenText Archive All-in-One," Product Overview, www.opentext.com, Nov. 2013, pp. 1-2.

(Continued)

*Primary Examiner* — Truong V Vo
(74) *Attorney, Agent, or Firm* — Nathan M. Rau (57) ABSTRACT

The disclosure relates to a method for archiving files of a local file system of a client system in a remote storage system. The local file system and the remote storage system are communicatively coupled via a network. The method comprises executing an archive process on an archive computer system communicatively coupled to the network. The archiving is solely controlled by the archive process. The execution causes the archive computer system to receive a configuration comprising share metadata, descriptive of a file share in the local file system, and a network address of the client system; remotely access the local file system using the configuration; scan the files of the file share to identify candidate files for archiving; and archive the candidate files by copying the candidate files to the remote storage system.

20 Claims, 6 Drawing Sheets

(56) References Cited

U.S. PATENT DOCUMENTS

| | | | |
|---|---|---|---|
| 2013/0110779 A1* | 5/2013 | Taylor | G06F 16/1844 |
| | | | 707/624 |
| 2014/0006354 A1 | 1/2014 | Parkison et al. | |
| 2014/0052706 A1 | 2/2014 | Misra et al. | |
| 2016/0019224 A1 | 1/2016 | Ahn et al. | |
| 2016/0210194 A1 | 7/2016 | Kumarasamy et al. | |
| 2016/0292040 A1 | 10/2016 | Kumarasamy | |
| 2017/0011051 A1* | 1/2017 | Specht | G06F 16/113 |

OTHER PUBLICATIONS

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

CLIENTLESS ACTIVE REMOTE ARCHIVE

BACKGROUND

The present disclosure relates to digital data archiving, and more particularly, to archiving files in a remote storage system such as a cloud storage compute node.

A system of one or more client compute nodes is connected to a cloud storage via network. Files stored on the client file systems are archived into the cloud storage and are retrieved from the cloud storage by an archive software. The way the archive software typically works is "client driven": the files to be archived have to be selected specifically on client side. Once file archiving begins, the archive software sends a copy of a file to storage volumes on disk devices or devices that support removable media, such as tape. After this, the original file is removed from the filesystem, or still stays on client side. An archived file is retrieved from the filesystem by returning an archive copy of the file from the cloud to the workstation. This retrieve processing is done in a selective way. Files are selected for retrieve initiated from client side.

The described architecture is triggered by the activity of the client. The client side is the active part and initiates the data transfer. This is the most common architecture used in this area.

The significant growth of data confronts users with new challenging situations in terms of data protection. Users no longer primarily store their data on local storage drives. Data is more and more stored on and synchronized with remote clouds. Cloud computing provides remote storage. Cloud storage allows users to store and access data in the cloud, without the need of knowing the details of where files are stored or having to manage physical storage devices.

SUMMARY

It is an objective of the present disclosure to provide for methods, a system, and a computer program product for remote archiving of files stored on a client computer system. Embodiments of the disclosure are given in the dependent claims. Embodiments of the present disclosure can be freely combined with each other if they are not mutually exclusive.

In one aspect, the disclosure relates to a method for archiving files of a local file system of a client system in a remote storage system, wherein the local file system and the remote storage system are communicatively coupled via a network, wherein the method comprises executing an archive process on an archive computer system communicatively coupled to the network, wherein the archiving is solely controlled by the archive process, and wherein the execution causes the archive computer system to:
receive a configuration comprising share metadata and a network address of the client system, the share metadata being descriptive of a file share in the local file system,
remotely access the local file system using the configuration,
scan the files of the file share to identify candidate files for archiving, and
archive the candidate files by copying the candidate files to the remote storage system.

In another aspect, the disclosure relates to a method for archiving files of a local file system of a client system in a remote storage system, wherein the local file system and the remote storage system are communicatively coupled via a network, wherein the method comprises executing an archive process on an archive computer system communicatively coupled to the network, wherein the archiving is solely controlled by the archive process, and wherein the method comprises:
providing a file share in the local file system for archiving,
transmitting a configuration comprising share metadata and a network address of the client system to the archive computer system, the share metadata being descriptive of the file share,
based on the configuration, receiving a remote access by the archive process to the local file system, the remote access comprising scanning the files of the file share to identify candidate files for archiving, and
transmitting the candidate files to the remote storage system for archiving.

In a further aspect, the disclosure relates to an archive computer system for archiving files of a local file system of a client system in a remote storage system, wherein the archiving is solely controlled by the archive computer system, wherein the archive computer system is communicatively coupled to the local file system and the remote storage system via a network, wherein the archive computer system comprises memory and a processor, and wherein the memory has incorporated computer-executable instructions which, when executed by the processor, cause the archive computer system to:
receive a configuration comprising share metadata and a network address of the client system, the share metadata being descriptive of a file share in the local file system,
remotely access the local file system using the configuration,
scan the files of the file share to identify candidate files for archiving, and
archive the candidate files by copying the candidate files to the remote storage system.

In yet another aspect, the disclosure relates to a computer program product for archiving files of a local file system of a client system in a remote storage system, wherein the computer program product comprises a computer-readable storage medium having program instructions embodied therewith, and wherein the program instructions are executable by a processor to cause the processor to execute the method according to embodiments of the disclosure.

BRIEF DESCRIPTION OF THE DRAWINGS

In the following, embodiments of the disclosure are explained in greater detail, by way of example only, making reference to the drawings in which.

DETAILED DESCRIPTION

Digital file archiving to a remote storage system is traditionally controlled by software applications running on the client computing node where the original files are stored. Such client-side applications control the archiving process by generating a list of eligible files for archiving and initiating the file transfer to the remote storage. Contemporary computing environments often contain a large number of such client nodes, e.g. 2000 clients in a larger company network, or even up to millions of clients if archiving is offered as a web service. This evokes the necessity to administer each installed client application whenever the archiving software is changed, e.g. when a security patch is applied. Important security fixes may become effective with delays which are too large to prevent a vulnerability exploitation effectively. Complexity further increases with the diversity of configurations among the multitude of clients (e.g. different operating systems, legal requirements, etc.). In addition, it is difficult to perform the archiving efficiently, e.g. to distribute network load caused by the client applications uniformly in time. Therefore, it would be helpful to have a central archive process which needs to be updated only once and automatically controls and performs remote archiving for all clients without further client activity or user interaction.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 1:
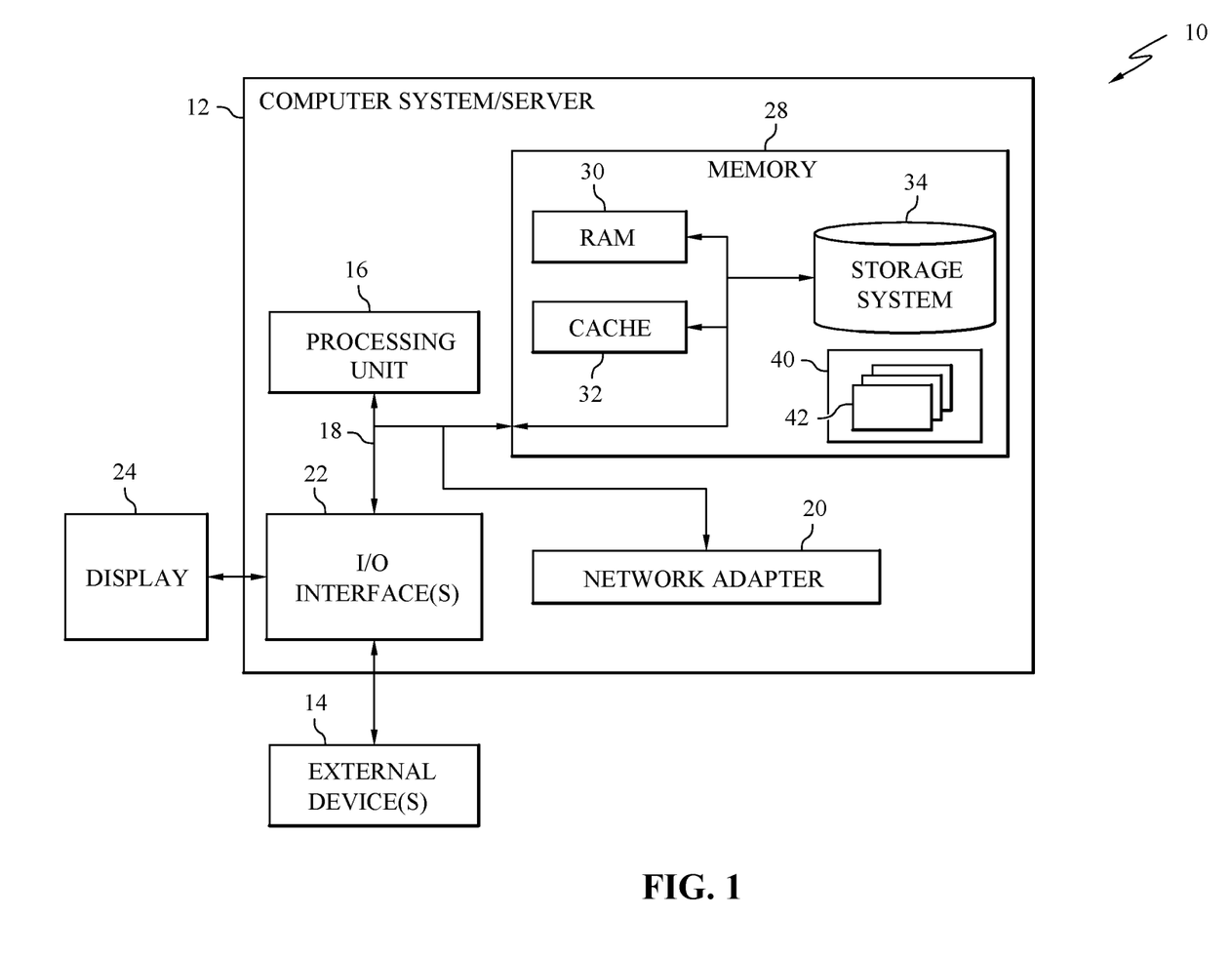
FIG. 1 is a block diagram that depicts a cloud computing node according to illustrative embodiments.

A cloud computing environment is service oriented with a focus on statelessness, low coupling, modularity, and semantic interoperability. At the heart of cloud computing is an infrastructure comprising a network of interconnected nodes. Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
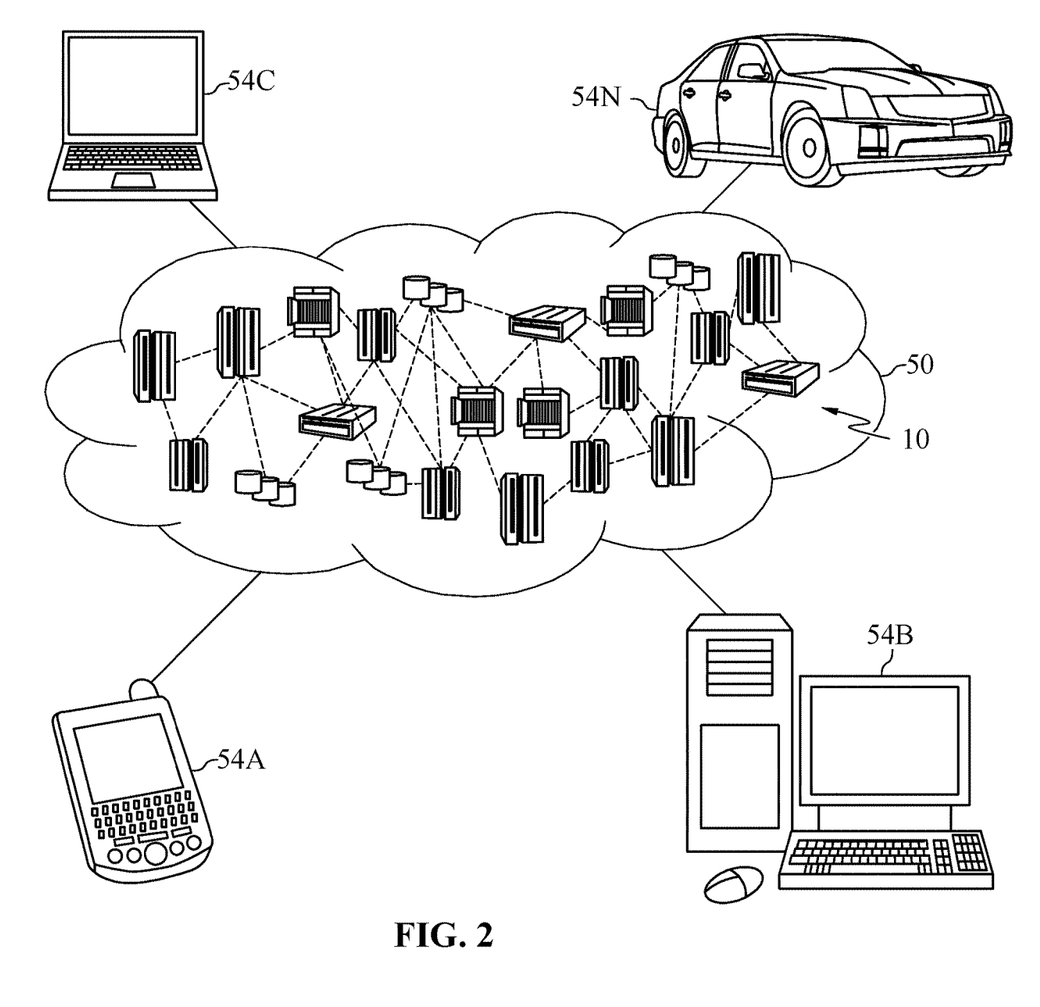
FIG. 2 depicts a cloud computing environment according to illustrative embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
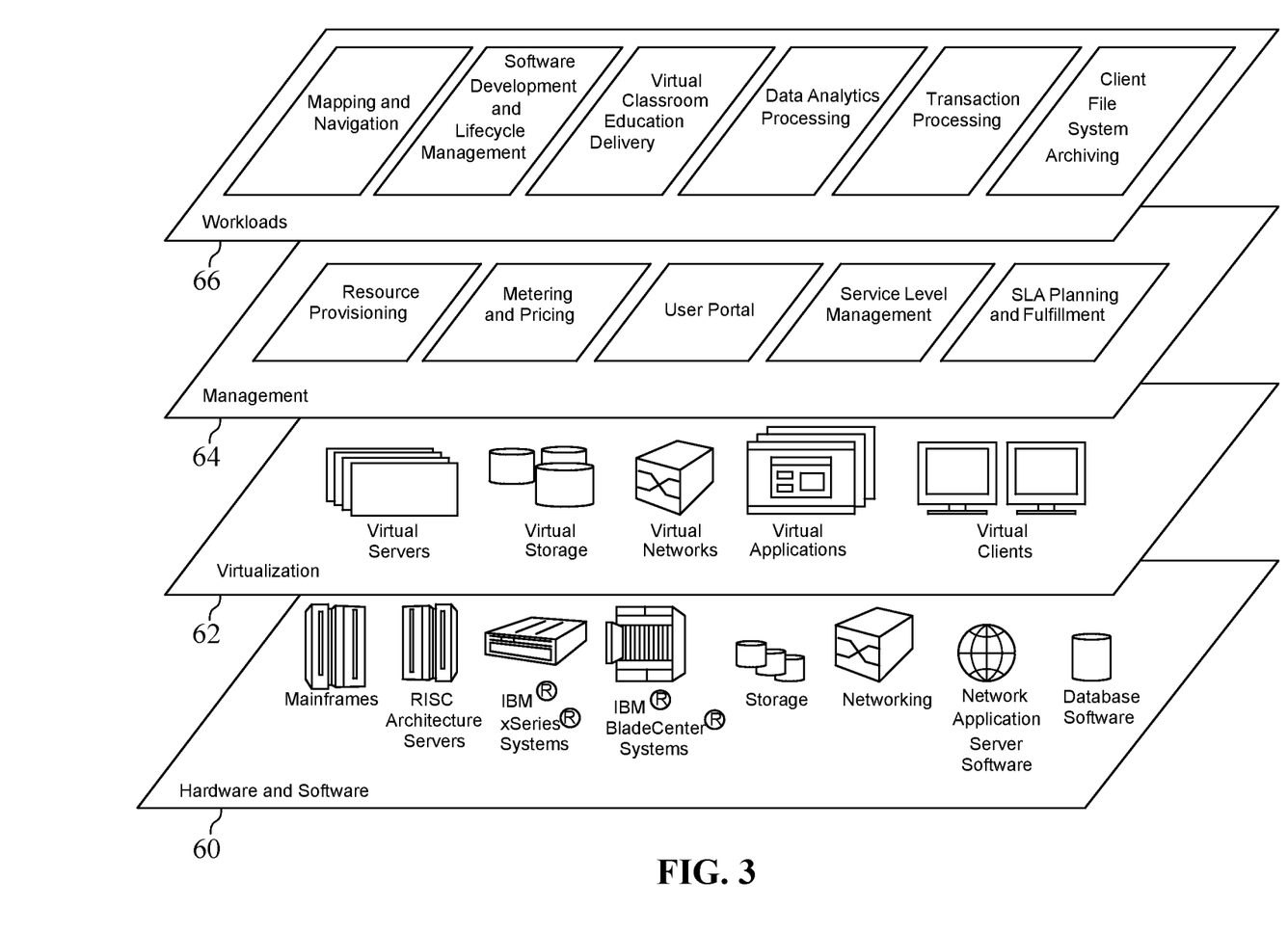
FIG. 3 depicts abstraction model layers according to illustrative embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided: Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and client file system archiving as provided by embodiments of the disclosure.

According to an embodiment, the remote storage system is provided as a service in a cloud computing environment. This may yield the advantage that no dedicated hardware is needed to operate the archive process, which may result in cost savings. Further advantages may result from the characteristics described above, such as elasticity or resource pooling.

The present disclosure teaches a novel system and method of archiving files from client systems to a remote storage system, such as cloud storage, and retrieving them from the remote storage back to the client system. At least one client compute node is a client system that creates user data. At least one compute-storage node, herein called archive computer system, hosts a remote storage service that provides remote storage function to the client system. The client system exports at least one local file system to the remote storage service. The user data created on the client compute node can be archived in and retrieved from the remote storage file system. It may no longer be necessary to install any client software packages on client side, because this approach works with remote function provided by a remote storage service provider. The term "clientless", as used herein, refers to the fact that embodiments of the disclosure are void of an archiving software application on the client system.

Embodiments of the disclosure may provide the function to actively archive file system objects created on a client system and to store them in a remote storage system. Embodiments may solve the problem that every single client must have specific client software installed and needs local client-specific settings. Embodiments may also solve the problem of an unavoidable subsequent high effort of configuration, administration and maintenance for all the clients. Embodiments may further solve the problem that for a typically huge amount of clients this effort increases rapidly.

As will be described in greater detail further below, each client file system to be archived is configured once by a user of the client system. Afterwards, the archiving as well as changes to the archiving service (e g administrative configuration, security or other updates) are centered to the archive computer system. Therefore, embodiments of the disclosure may have the advantage of reducing administrative effort for archiving to one single central archive computer system instead of a large number of client computer systems.

In consideration of security aspects, especially concerning remote access to the client file systems, this disclosure delivers three different service levels for archiving and retrieving files, corresponding to three different security levels. Therefore, the problem of access authorization may be solved by embodiments of the disclosure by offering different customizable configurations. Furthermore, embodiments of the disclosure may have the advantage of reduced proneness to security vulnerabilities as security updates become effective for all clients simultaneously with a single security update of the archive process and/or the central remote archive computer system.

The archive computer system is a computing node within the network which may be separate from the remote storage system. Its network connections to the client system and the remote storage system may form a linear topology (such that the archive computer system interfaces the client system and the remote storage system) or a triangular topology (client, archive, and storage system being mutually connected and communicating independently from each other). On the other hand, the archive computer system may be identical to the remote storage system. In this case, the appliance of the remote storage system (including processor(s), memory, network connections etc.) is shared by the archive process and the service providing remote storage capability. The archive computer system comprises at least one processor, memory, and at least one connection to the network. In particular, the archive computer system may be a distributed system comprising a plurality of computing nodes within the network. It is adapted for executing the archive process, using its processor(s) and memory, to remotely access the local file system for performing the archiving on the remote storage system.

The remote storage system, i.e. the compute-storage node that provides the remote storage, has the ability to at least read the data stored on the client system (the client compute node) in case that the archive computer system is not interfacing the client computer system and the remote storage system. In case of the interfacing topology as described above, the archive computer system has the ability to at least read the data stored on the client system as there is no direct data transfer between the client system and the remote storage system. Data archived to the remote storage is fetched from the client system by the interfacing archive computer system and then transferred to the remote storage system. The remote storage system may comprise a single compute node, where the remote storage is controlled by one machine running the remote storage service, or it may be a distributed system where the machine hosting the storage service and the remote storage are separate nodes. As described further below, the user may define policies to set the security level (and consequentially also the service level) by configuring the access rights of the remote storage service to the user data which is stored in the client file systems.

The client system is connected to the network and comprises at least one processor and memory. The memory comprises non-volatile memory where data file objects are stored in the local file system. The client's processor is capable of controlling the files, including remote access to the files via the network connection based on a remote access policy comprising one or more access rights or rules. The client system further comprises user interface devices (as a single node or distributed in a separate terminal) such as a monitor, a keyboard and/or a pointing device which allow a user to configure the client, including defining a file share and within the local file system and, optionally, remote access rights specific to the file share. The client system is capable of providing data to the network using its network connection, including transmitting the configuration, which may for instance be defined by the user using the user interface devices, to the archive computer system, and including remote access to the candidate files to the archive computer system or the remote storage system for archiving.

According to an embodiment, the archive process interfaces the client system and the remote storage system via a secure web communication protocol. A secure web communication protocol may be any network protocol which is capable of protecting data transferred to and from the archive process from being read by a third part. Typically, a secure web communication protocol uses an encryption technology to encrypt the data transferred between the client system and the archive computer system, as well as the data transferred between the archive computer system and the remote storage system. Most typically, but not exclusively, a secure web communication protocol will be part of the TCP/IP-protocol family, such as the hypertext transfer protocol secure (HTTPS), the secure file transfer protocol (SFTP), FTP over TLS (FTPS), and the like. Using a secure web communication protocol may beneficially protect the privacy of the data, including the candidate files and their metadata, during transport over the network caused by the archive process.

The archive computer system receives a configuration comprising share metadata and a network address of the client system, wherein the share metadata is descriptive of a file share in the local file system. The share metadata comprise at least a specifier indicating the logical address of the share within the local file system, such as a drive letter of a virtual or physical drive, a root directory, or another node of the local file system which is suitable for specifying the share in the context of the local file system. The share metadata may comprise further information characterizing the file share. In an example, which will be discussed further below, the share metadata further comprises a specifier for remote access rights to the file share. The nature of the network address of the client system depends on the protocol used for communicating with the client system via the network. Typically, the network address is specified as an IP address if the network is based on the internet protocol (IP), a uniform resource locator (URL), or a similar domain name which can be resolved by a domain name service (DNS) running within the network.

Preferably, the archive process comprises or is complemented by a web application executed on the archive computer system. The web application may be used as a user interface to the archive process and/or the archive computer system. The receiving of the configuration may therefore be implemented as a function of the web application. However, the step of receiving the configuration is not restricted to an implementation which comprises such web application or similar network-based user interface through the archive computer system. It is also possible, for instance, that the configuration is stored as a configuration file, a database, or a database entry stored on the local file system, which is fetched or queried from the client system by the archive process. In these cases, the client system must provide a remote read access to at least the configuration file and/or the database comprising the configuration.

In an illustrative example, the receipt of the configuration is implemented with the following steps, making use of a web application. A user of the client system uses operating system options to enable the local file system for sharing. In Microsoft® Windows®, for instance, this would require the user to open Windows Explorer, right click e.g. on a drive letter of a memory drive containing the files to be archived, click on "share" and process the subsequent dialog. The user then sets the appropriate rights for remote access to the shared file system (typically part of the "enable share" process). Next, the user opens the web interface to the archive computer system (see detailed description further below). This preferably requires authentication (e.g. user name and password). Eventually, the user of the client system enters the following configuration information to the web interface: the drive letter of the shared file system, the IP address or fully qualified network name of the client system (e.g. node.location.country.company.com), a check mark for access rights of the remote system to the shared file system ("read", "read and create", or "read, create and delete"), and a metadata decision list and values to be compared in candidates selection process (see detailed explanation further below). The user finishes the configuration by closing the web interface ("OK" button or the like).

With the receipt of the configuration by the archive computer system, the file share (which may be the whole content of the local file system if the root node is selected accordingly) is exported to the remote storage system. The export is complete if all information needed for archiving is known to the archive computer system. The information conveyed to the archive computer system by the configuration allows the archive computer system to remotely accesses the local file system for performing the archiving.

According to an embodiment, the identification for archiving is based on file metadata descriptive of the files. This may facilitate the automatic identification of candidate files compared to basing the analysis on an interpretation of the file contents (such as keywords indexing).

According to an embodiment, the method further comprises receiving a criterion for the file metadata, and the scanning comprises identifying a given file as a candidate file if its file metadata fulfills the criterion. A criterion for the file metadata is generally a logical expression which includes a metadata object, a logical operator, and at least one reference value for that metadata object. The logical expression representing a criterion may be encoded in a programming language, as a regular expression, or in another human readable form. If a web application is used for entering the criteria, a user may specify the metadata object, the logical expression, and the reference value(s) by selecting suitable entries from predefined lists presented to the user. The metadata object includes any accessible data type descriptive of the files hosted by the local file system which is remotely accessible on the client system. Examples for the metadata object include the time stamp of the latest file access, the file size, and the file name extension or another identifier for the file type. In a usage scenario, a user wants to archive all Microsoft™ Word™ files which were not edited for more than 30 days. For this purpose, the user specifies a criterion 'access time>30 days' and another criterion 'file name=*.doc'. Then, the user joins the two criteria to a single criterion by using the third logical expression 'and'. The user can also specify another independent archiving criterion, such as 'file size>1 MB' if it is desired to keep the local file system free from large files. Defining the criterion for the file metadata may have the advantage to increase the efficiency of the archive process by reducing the number of files to be archived. This may decrease the network traffic caused by the archive process and also the storage capacity required from the remote storage system for archiving.

According to an embodiment, the file metadata includes a time stamp of the most recent file access. This may also increase archiving efficiency as described above by releasing only those file for archiving which were not accessed for a specified period of time. This can be illustrated with the following example: files of a recent project are regularly edited, usually several times a day, on the client system over a certain period of relevance. This period of relevance ceases, e.g. if the project is finished. The access frequency for the project files then usually substantially decreases and, after some time, the files of the finished project become eligible for archiving as specified in the criterion including the time stamp of the most recent file access. In this way, archiving is delayed for the project files until there is a high probability that the project is finished. Without the file access time stamp criterion, the network traffic caused by the archiving activity would be much higher as each of the project files would be eligible for archiving every time the client system is contacted by the archive process. For the same reason, the archive process would cause a much higher workload for the remote storage system.

The following example illustrates an exemplary procedure for identifying the candidate files and archiving the identified candidates afterwards. The identification starts with the archive process opening the file share for reading the directory structure and file metadata. In detail, the archive process starts the file system scan at the root directory and scans the file system as follows:

1) Open the current directory
2) Read the metadata of the first file in directory
3) Compare the metadata to the list of criteria defined by the user. If the values match, add the file name to a list of files to be archived.
4) Loop steps 2-4 over all files in the directory
5) Loop steps 1-4 over all subdirectories recursively The result of this scan is a file list which contains all file names that are eligible for archiving. The archiving is then performed by processing the list of candidates as follows. The archive process opens the first file in the list for reading. If necessary, the archive process reproduces the directory structure of the given file on the remote storage system. Then, it creates a new file in the same directory of the remote storage, reads the file data from the share and writes it to the newly created file. When copying is finished, the archive process closes both files and continues the archiving for the next entry in the file list until all files in the list are processed.

Figure 4:
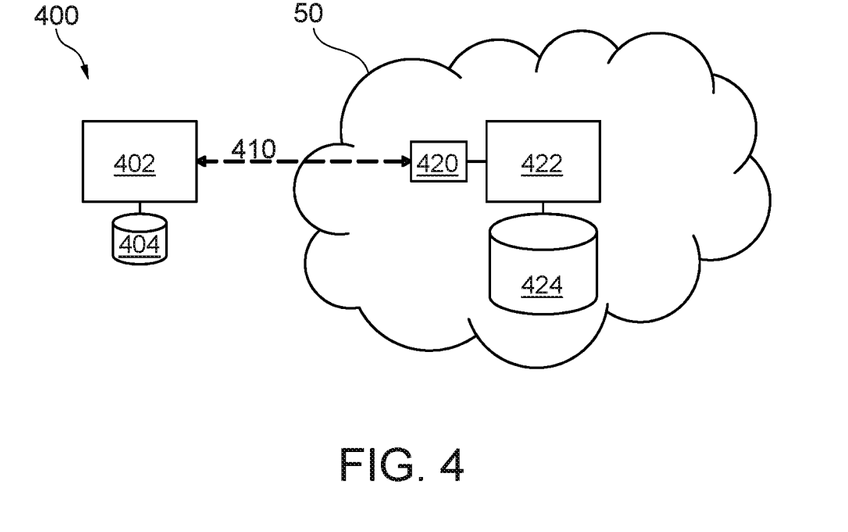
FIG. 4 shows a schematic computing environment comprising an archive computer system according to illustrative embodiments.

FIG. 4 shows an exemplary computing environment 400 where a central, active archive computer system 420 is interfacing a central remote storage system 422 and a client compute system 402. The archive computer system 420 is part of a cloud computing environment 50 and connects to client system 402 via network 410 (LAN, WAN). The client system 402 comprises local file system 404. The remote storage system 422 comprises and manages remote storage 424. The local file system 404 is exported to remote storage system 424 via network 410. Files fetched from client system 402 are passed through archive computer system 420 to remote storage system 422 for archiving in remote storage 424. Archived copies stored in remote storage 424 are passed through archive computer system 420 for retrieving and/or restoring in client system 402.

According to an embodiment, the configuration further comprises remote access rights for the files of the file share, wherein the remote access rights comprise at least a read access. According to an embodiment, the remote access rights further comprise a right to create a new file in the file share. According to an embodiment, the remote access rights further comprise a right to delete a file from the file share, wherein the method further comprises deleting each candidate file after the archiving. The three basic remote access rights 'read', 'create' and 'delete' may beneficially enable a user of the client system to define a service level of the archiving service dependent on security aspects of the computing environment provided by the network. In general, a higher service level implies more extensive access rights to the local file system in order to perform properly. If, for instance, the archive process is provided as a service in a private cloud to which the client system connects via an internal enterprise network, the user may regard the network as safe enough to grant a full write access (i.e. create and delete) to the local file system. On the other hand, if the client system connects to the archive computer system via the internet, it is desirable to maintain a high security level by granting read only access to the local file system, which may be complemented by further security means such as an encrypted network connection as described further above.

According to an embodiment, the method further comprises, for each candidate file copied to the remote storage system, creating a hyperlink in the file share, the hyperlink comprising a locator specific to the given copy. The specific locator may be a logical address of a file which is usually located on the archive computer system or the remote storage system. The locator may point directly to the copy of the candidate file on the remote storage system or an archive entry (as discussed below) or another landing page on the archive computer system. A file-specific hyperlink on the local file system may allow for an easier and faster access to the archived files for retrieving as discussed further below. Furthermore, the presence of a hyperlink is a visual indicator that a given file has been archived.

According to an embodiment, the hyperlink has the same name as the given copy. This may allow for a faster and unique assignment of the hyperlink to the archived file. In case that the configuration comprises a delete right, the archived files are deleted from the local file system and the identically named hyperlink remains as the only representation of the archived file. This may provide a seamless integration of the archive service into the client system without having to run a client archiving software on the client system as described further above. In addition, deleting a file from the local file system after archiving may have the advantage to increase data storage capacity of the client system.

The following example illustrates a post-processing procedure for the archived files. If the archive process has only a read right, no post-processing is possible and the procedure ends. If access is granted for reading and creating, the archive process walks through the list of candidates once more to create a hyperlink for each file in the share that points to the archive entry for that file in the remote storage (filename:\\IP of remote storage\: +file name+file ending+ .html; example: "\\33.44.55.66\:myFile.doc.html"). If remote deleting is allowed, too, the remote system deletes the original file from the file share. As a result, the user of the client system can still see all files in the file share, but some are replaced by hyperlinks.

According to an embodiment, the method further comprises generating an archive entry for each archived file, wherein the archive entry is descriptive of the archived file. An archive entry is preferably a set of metadata descriptive of an archive file. The file metadata of an archive entry may be stored on the archive computer system and/or on the remote storage system. The file metadata stored in the archive entry may comprise the file metadata retrieved during the archiving from the local file system, and optionally, further information descriptive of a given archived file, such as a hyperlink pointing to the storage location of the archive copy of the file, metadata about the archiving process, including e.g. a time stamp of the time when the file was archived, and/or further information such as the name of a provider operating the archive process, the country where the remote storage system is located, etc. The archive entry may be stored, for instance, as a specific file (e.g. an HTML file generated during the archiving) or as a database entry within an archive database containing information about all files archived by the archive process at least from the local file system of the client system. In the latter case, the archive entry may be converted into a human readable form (e.g. said HTML file) by the archive computer system upon user request. Creating an archive entry comprising metadata of an archived file may increase the efficiency of the archive process as an archive copy of a particular file does not have to be transferred back to the client system if only the metadata are requested by the user. The metadata of the archive entry may alternatively be transferred to the client system in a non-human readable form, which may be advantageous for interpreting and visualizing the metadata by means of a software executed on the client system (e.g. the operating system or a file browser).

Alternatively, the archive entry comprises the archive copy of the candidate file itself. This may allow for a direct access to an archived file, and thus, retrieving the archived file in a shorter time.

According to an embodiment, the method further comprises executing a web application on the archive computer system, wherein the web application is configured for transmitting a list of files copied from the file share to the client system. A web application is a piece of software which provides a user interface to the archive computer system and/or the archive process at least for visualizing the set of files (e.g. as a list or a tree view containing file metadata and/or hyperlinks to the archive entries) which were archived to the remote storage system at a given time. The user interface function of the web application may also be beneficial for configuring the archive process as described further above, authenticating the user of the client system, and/or retrieving the archived files from the remote storage system. The web application is typically called by a web browser executed on the client system. It may be executed on the archive computer system as a separate process or as a part of the archive process. In the latter case, the web application is a front end user interface of the archive process.

Figure 5:
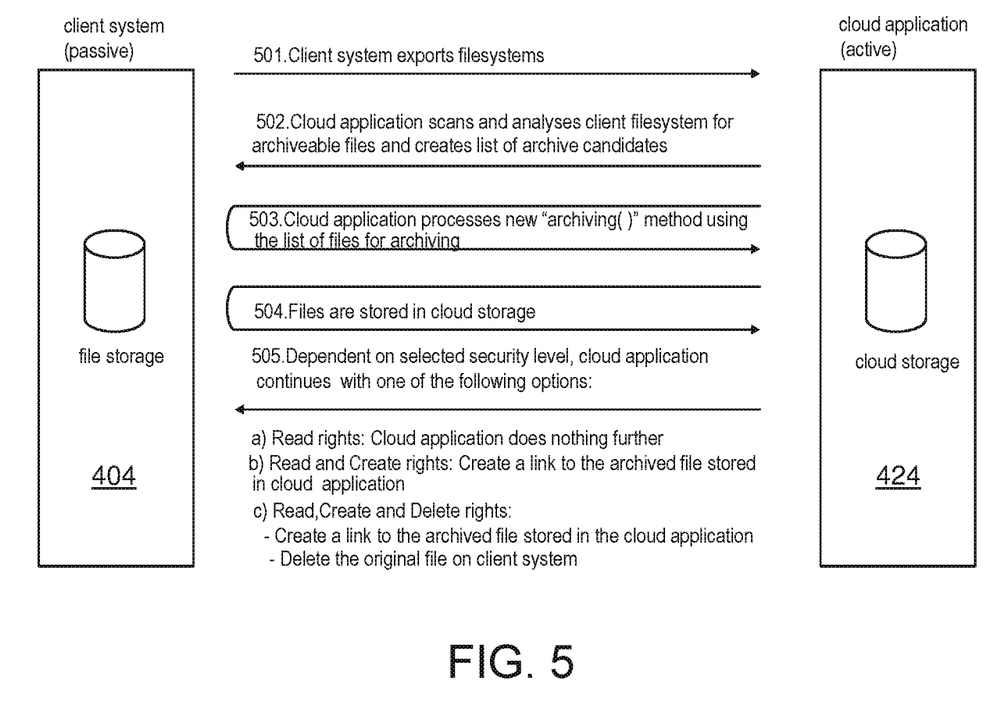
FIG. 5 schematically illustrates a process of archiving files according to illustrative embodiments.

Now turning to FIG. 5, a typical routine for archiving files from local file system 404 to remote storage 424 (implemented as a cloud storage solution) is shown schematically. In block 501, the client system exports the file systems which the user wants to be available for the archiving by the archive process. In block 502, the archive process scans and analyses this file system and searches for files which can be archived. The archive process creates a list of eligible candidates. This list is used in block 503 to copy the files on the list into the remote storage 424. At block 504, there are two copies of the files available, one on the client side (local file system 404) and one in the remote storage 424.

For further processing, the archive process analyzes the security level. There are three different steps possible to proceed in block 505: a) The archive process has read rights in the exported client file systems. The archive process will not proceed with any further steps. The result is that a copy of the files from the exported client file system was made in remote storage 424. There are two copies. b) The archive process has read and create rights in the exported client file systems. The archive process will proceed with creating a link (pointing to the archived file in remote storage 424) in the exported client file system. This link has the same name as the archived file and contains a hyperlink. The newly created link and the original file are available in client file system 404. c) The archive process has read, create and delete rights in the exported client file systems. The archive process proceeds with creating a hyperlink (pointing to the archived file in remote storage 424) in the exported client file system. This link has the same name as the archived file. In this case the archive process will delete the original file in the exported client file system. Hence, there is only the initially created link available in client file system 404.

According to an embodiment, the method further comprises receiving a request from the client system, wherein the request comprises a locator descriptive of a given archived file, and the archive process is further configured for redirecting the request to the archive entry descriptive of the requested archived file. This may allow for retrieving an archived file from the remote storage in case that the remote access rights comprise only a read access. The user can retrieve the archived file directly if the archive entry comprises the archived file itself, or indirectly by calling the archive entry page as described above (e.g. using the web application and optionally after being authenticated by the archive computer system) from where an access to the archived file is possible via a hyperlink to the storage location of the archived file in the remote storage system. As there are no remote access rights for writing to the local file system, the connection to the remote storage system (or the archive computer system in an interfacing network topology as described further above) may be caught by a suitable software function of the client system (e.g. a download manager functionality of a web browser), allowing the user to specify a location within the local file system where the retrieved archived file should be downloaded to, or for downloading the retrieved file to a standard download location such as a download folder.

According to an embodiment, the method further comprises receiving a request from the client system, wherein the request comprises a locator descriptive of a given archived file, and the archive process is further configured for creating a new copy of the archived file in the file share. This may allow for an automatic retrieval of the requested archived file without having to interact with the user to specify a storage location for the retrieved file. The retrieved copy may be stored to a standard location for storing files retrieved from the remote storage system, but it is also possible to restore the retrieved copy to the same folder of the local file system as the original file which was archived from the local file system if its original storage location was saved to the archive computer system during the archiving (e.g. as part of the archive entry). If a file with the same name as the restored copy already exists in the folder to which the copy shall be restored, the copy may be renamed automatically or a rename message may be prompted to the user.

According to an embodiment, the archiving further comprises, for each candidate file, saving the logical address of the candidate file in the local file system to the archive computer system, the method further comprises receiving a request from the client system, wherein the request comprises a locator descriptive of one of the archived files, and the archive process is further configured for restoring the requested archived file to the logical address saved for this archived file. This may allow for a full automation of the retrieval of archived files. The user does not have to be queried for a storage location or a file name anymore. The method according to this embodiment requires full read and write access (corresponding to the remote access right for deleting) to the file share and may beneficially allow for an automatic reversion of a file to a former version which was archived to the remote storage system at an earlier time.

Figure 6:
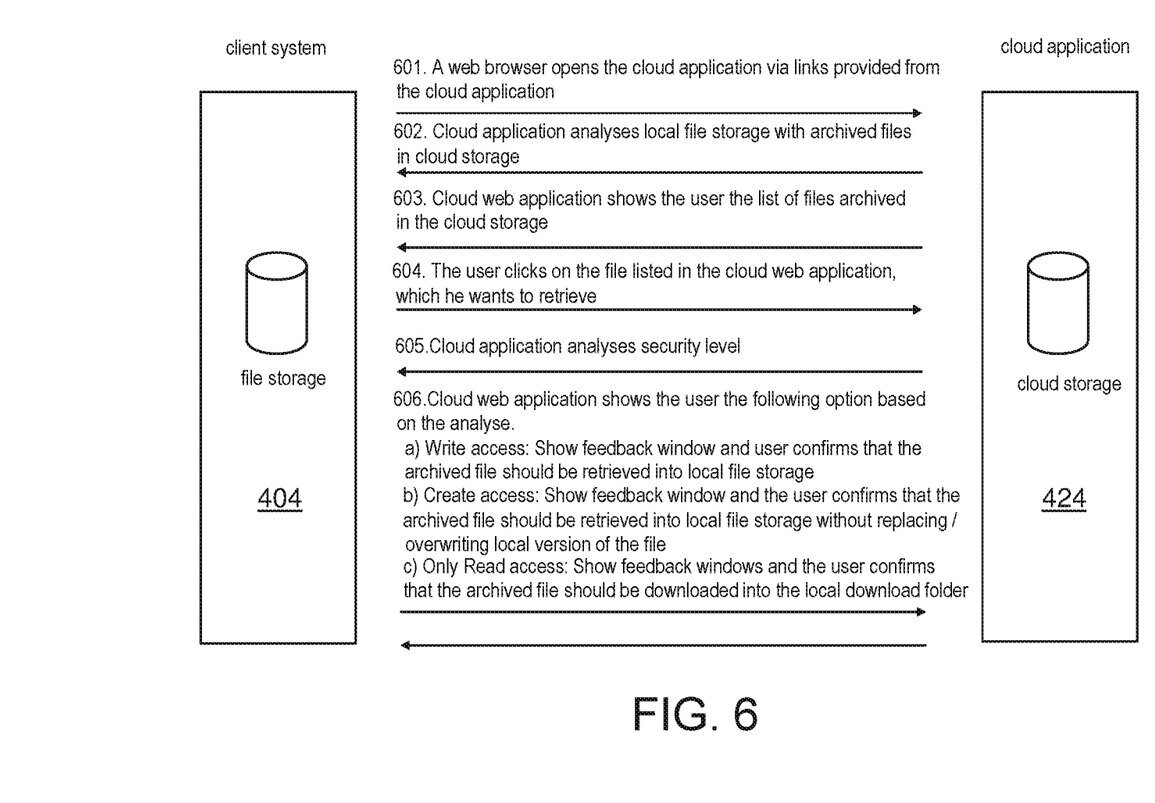
FIG. 6 schematically illustrates a process of retrieving an archived file according to illustrative embodiments.

Now turning to FIG. 6, a typical routine for retrieving archived files from remote storage 424 (implemented as a cloud storage solution) to local file system 404 is shown schematically. A web application is used as a user interface of the archive process for the retrieval. To retrieve a file or a set of files from remote storage 424 to client file system 404, a hyperlink, which was provided to the user during the archiving or in response to the user's retrieval request, opens the web application in block 601. In block 602, the archive process analyses local file system 404 and compares it to the archived files in remote storage 424. Based on this analysis, in block 603 the web application provides the user a list of hyperlinks to all available archived files in an organized view (e.g. tree view). In block 604, the user selects the file for retrieval by clicking on the appropriate link in the list.

For further processing, the archive process analyzes the security level in block 605. There are three different steps possible in block 606 to proceed with the retrieval: a) The archive process has full write rights in the exported client file systems. In this case, the web application shows a browser window and the user confirms the file retrieval to the client file system 404 in replacement of the file in local file system 404, if present. b) The archive process has create rights in the exported client file systems. In this case, the web application shows a browser window and the user confirms the file retrieval without replacing or overwriting the existing file version in local file system 404. c) The archive process has read-only rights in the exported client file systems. In this case, the web application shows a browser window and the user confirms the file download into the local download folder in client file system 404.

Embodiments of the disclosure may comprise further capabilities for managing the archiving from a great number of client systems. In a non-exhaustive example, the archive process may use a time schedule (e.g. once per week, or every third Friday of the month) for visiting the client systems in order to identify and archive new candidate files on the client systems. The management may be customized further, e.g. on a client or country-specific base, in order to take legal requirements into account, to perform the archiving dependent on daytime specific network load (e.g. at night time at the local time zone of a particular client system), etc. In any case, the archiving is fully controlled and performed by the archive process executed on the archive computer system. The archive process may comprise further analytical functions such as a semantic analysis of file contents in order to enable a context-specific identification of candidate files. The criteria for identifying a candidate file may be managed in a user-specific, client-specific, share-specific, country-specific way, etc.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for archiving files of a local file system of a client system in a remote storage system, the local file system and the remote storage system being communicatively coupled via a network, wherein the local file system resides on the client system, the method comprising:
   executing an archive process on an archive computer system communicatively coupled to the network, the archiving controlled by the archive process,
   receiving, by the archive computer system, a configuration comprising share metadata and a network address of the client system, the share metadata being descriptive of a file share in the local file system,
   remotely accessing, by the archive computer system, the local file system using the configuration,
   scanning, by the archive computer system, the files of the file share to identify candidate files for archiving, wherein the files in the file share are electronic files, and
   archiving, by the archive computer system, the candidate files by copying the candidate files to the remote storage system.

2. The method of claim 1, the configuration further comprising remote access rights for the files of the file share, the remote access rights comprising at least a read access.

3. The method of claim 2, the remote access rights further comprising a right to create a new file in the file share.

4. The method of claim 3, further comprising, for each candidate file copied to the remote storage system, creating a hyperlink in the file share, the hyperlink comprising a locator specific to a given copy.

5. The method of claim 4, the hyperlink having a same name as the given copy.

6. The method of claim 2, the remote access rights further comprising a right to delete a file from the file share, the method further comprising deleting each candidate file after the archiving.

7. The method of claim 1, further comprising generating an archive entry for each archived file, the archive entry being descriptive of the archived file.

8. The method of claim 1, further comprising executing a web application on the archive computer system, the web application being configured for transmitting a list of files copied from the file share to the client system.

9. The method of claim 1, further comprising receiving a request from the client system, the request comprising a locator descriptive of a given archived file, the archive process being further configured for redirecting the request to the archive entry descriptive of the requested archived file.

10. The method of claim 1, further comprising receiving a request from the client system, the request comprising a locator descriptive of a given archived file, the archive process being further configured for creating a new copy of the archived file in the file share.

11. The method of claim 1, the archiving further comprising, for each candidate file, saving the logical address of the candidate file in the local file system to the archive computer system, the method further comprising receiving a request from the client system, the request comprising a locator descriptive of one of the archived files, the archive process being further configured for restoring the requested archived file to the logical address saved for this archived file.

12. The method of claim 1, the identification for archiving being based on file metadata descriptive of the files.

13. The method of claim 12, further comprising receiving a criterion for the file metadata, the scanning comprising identifying a given file as a candidate file if its file metadata fulfil the criterion.

14. The method of claim 13, the file metadata including a time stamp of the most recent file access.

15. The method of claim 1, the archive process interfacing the client system and the remote storage system via a secure web communication protocol.

16. The method of claim 1, the remote storage system being provided as a service in a cloud computing environment.

17. A method for archiving files of a local file system of a client computer system in a remote storage system, the local file system and the remote storage system being communicatively coupled via a network, wherein the local file system resides on the client system, the method comprising executing an archive process on an archive computer system communicatively coupled to the network, the archiving being solely controlled by the archive process, the method comprising:

providing a file share in the local file system for archiving, transmitting a configuration comprising share metadata and a network address of the client computer system to the archive computer system, the share metadata being descriptive of the file share, based on the configuration, receiving a remote access by the archive process to the local file system, the remote access comprising scanning the files of the file share to identify candidate files for archiving, wherein the files in the file share are electronic files, and transmitting the candidate files to the remote storage system for archiving.

18. An archive computer system for archiving files of a local file system of a client system in a remote storage system, the archiving being solely controlled by the archive computer system, the archive computer system being communicatively coupled to the local file system and the remote storage system via a network, the archive computer system comprising memory and a processor, the memory having incorporated computer-executable instructions which, when executed by the processor, cause the archive computer system to:

receive a configuration comprising share metadata and a network address of the client system, the share metadata being descriptive of a file share in the local file system, wherein the local file system resides on the client system, remotely access the local file system using the configuration, scan the files of the file share to identify candidate files for archiving, wherein the files in the file share are electronic files, and archive the candidate files by copying the candidate files to the remote storage system.

19. The archive computer system of claim 18 wherein the configuration further comprising remote access rights for the files of the file share, the remote access rights comprising at least a read access.

20. The archive computer system of claim 19 wherein the remote access rights further comprising a right to delete a file from the file share, the archive computer system further configured to delete each candidate file after the archiving.

* * * * *